United States Patent
Iwase et al.

(10) Patent No.: US 6,861,773 B2
(45) Date of Patent: Mar. 1, 2005

(54) STEPPING MOTOR

(75) Inventors: Masato Iwase, Fukushima (JP); Masaaki Takagi, Fukushima (JP)

(73) Assignee: NIDEC COPAL Corporation, Tokyo (JP)

( * ) Notice: Subject to any disclaimer, the term of this patent is extended or adjusted under 35 U.S.C. 154(b) by 0 days.

(21) Appl. No.: 10/600,835

(22) Filed: Jun. 23, 2003

(65) Prior Publication Data

US 2003/0234586 A1 Dec. 25, 2003

(30) Foreign Application Priority Data

Jun. 24, 2002 (JP) .................................... P.2002-183241

(51) Int. Cl.⁷ ............................................... H02K 37/00

(52) U.S. Cl. ...................... 310/49 R; 310/71

(58) Field of Search ............................. 310/49 R, 179, 310/208, 71, 68 C (56) References Cited

U.S. PATENT DOCUMENTS 4,271,370 A * 6/1981 DiMeo ........................ 310/266
4,665,331 A * 5/1987 Sudo et al. ............... 310/68 R

FOREIGN PATENT DOCUMENTS

| JP | 64-030672 | | 2/1989 | |
| JP | 5-67187 | | 9/1993 | |
| JP | 406022519 A | * | 1/1994 | .......... H02K/21/14 |
| JP | 7-33583 | | 7/1995 | |
| JP | 2002-136029 | | 5/2002 | |

* cited by examiner

Primary Examiner—Thanh Lam
(74) Attorney, Agent, or Firm—McGinn & Gibb, PLLC (57) ABSTRACT

A stepping motor including a rotor (1) having a permanent magnet 1b and magnetized in multipoles, a plurality of coils (2) arranged at a surrounding of the rotor (1) and wound around a radius direction of the rotor (1), a supporter (3) in a cylindrical shape for supporting the coils (2), and a casing (4) for surrounding the permanent magnet (1b), the coils (2) and the supporter (3) and fixed with the supporter (3), characterized in that the supporter (3) comprises an insulating film having a flexibility.

13 Claims, 6 Drawing Sheets

STEPPING MOTOR

BACKGROUND OF THE INVENTION

The present invention relates to a stepping motor.

In a related stepping motor having a stator constituted to be arranged with magnetic pole teeth at a surrounding of a rotor and to be wound with a coil around an axial line direction of the rotor for exciting the magnetic pole teeth, detent torque is generated between the rotor of a permanent magnet and the stator.

Further, it is known that detent torque is similarly generated in a motor of a so-called hybrid type having a motor stator constituted by providing a plurality of side magnetic poles and wound with a plurality of phases of an excitation winding as it a stepping motor described in Japanese patent publication Sho. 64-30672A or Japanese Utility Model Examined Publication Hei. 7-33583B.

The detent torque is generated also when current is not conducted to the coil and therefore, there is achieved an advantage of capable of self-holding a rotor.

Further, in Japanese Utility Model Publication Hei. 5-6718A, there is described a roller having a permanent magnet magnetized in a thickness direction and a pair of inductor plates interposing the magnet from both ends in the thickness direction.

However, when, for example, microstep drive is carried out by using a stepping motor generating such a detent torque, there is a case in which it is difficult to position the rotor at high speed by influence of the detent torque, which constitutes one factor of hampering high speed response of a stepping motor. On the other hand, there is also present a request of small-sized formation for the stepping motor.

SUMMARY OF THE INVENTION

Hence, it is an object of the invention to provide a stepping motor prompting high speed response by restraining detent torque and capable of achieving small-sized formation.

In order to solve the aforesaid object, the invention is characterized by having the following arrangement.

Aspect 1. A stepping motor comprising:
a rotor including a permanent magnet and magnetized in multipoles;
a plurality of coils arranged at a surrounding of the rotor and wound around a radius direction of the rotor;
a cylindrical supporter for supporting the plurality of coils including an insulating film having a flexibility; and
a casing for surrounding the permanent magnet, the plurality of coils and the supporter and fixed to the supporter.

Aspect 2. The stepping motor according to the aspect 1, wherein the supporter includes a flexible board.

Aspect 3. The stepping motor according to the aspect 2, wherein the flexible board includes a wiring pattern one end portion of which is electrically connected to the coil and includes a terminal portion at which other end portion of the wiring pattern aggregates.

Aspect 4. The stepping motor according to the aspect 3, wherein the terminal portion is projected to outside of the casing.

Aspect 5. The stepping motor according to the aspect 1 further comprising a cylindrical member constituted by winding a soft magnetic material in a strip-like shape a surface of which is insulatingly covered in a helical shape.

Aspect 6. The stepping motor according to the aspect 1, wherein the rotor includes:
the permanent magnet magnetized in a single pole in an axial line direction;
a plurality of magnetic pole teeth arranged at a surrounding of the permanent magnet and extended in an axial line direction of the permanent magnet; and
a pair of circular plate members respectively connected to end-portions of the permanent magnet for supporting the magnetic pole teeth, and
wherein the-magnetic pole teeth are alternately formed on one of the circular plate-members and other of the circular plate members.

Aspect 7. The stepping motor according to the aspect 1, wherein a thickness of the insulating film falls in a range from 0.1 mm to 0.2 mm.

Aspect 8. A method of manufacturing a stepping motor comprising the steps of:
providing a strip shape insulating film;
fixing a plurality of coils to the insulating film;
winding the insulating film into a cylindrical shape so as to dispose the fixed plurality of coils on an inner side of the insulating film;
after winding step, inserting the cylindrical shape insulating film into a cylindrical casing.

Aspect 9. The method according to the aspect 8 further comprising the step of disposing a rotor including a permanent magnet so that the casing surrounds the permanent magnet and the plurality of coils.

Aspect 10. The method according to the aspect 8, wherein in the winding step, one end of the insulating film is fixed to the other end of the insulating film so as to form the cylindrical shape.

DETAILED DESCRIPTION OF PREFERRED EMBODIMENTS

Figure 1A:
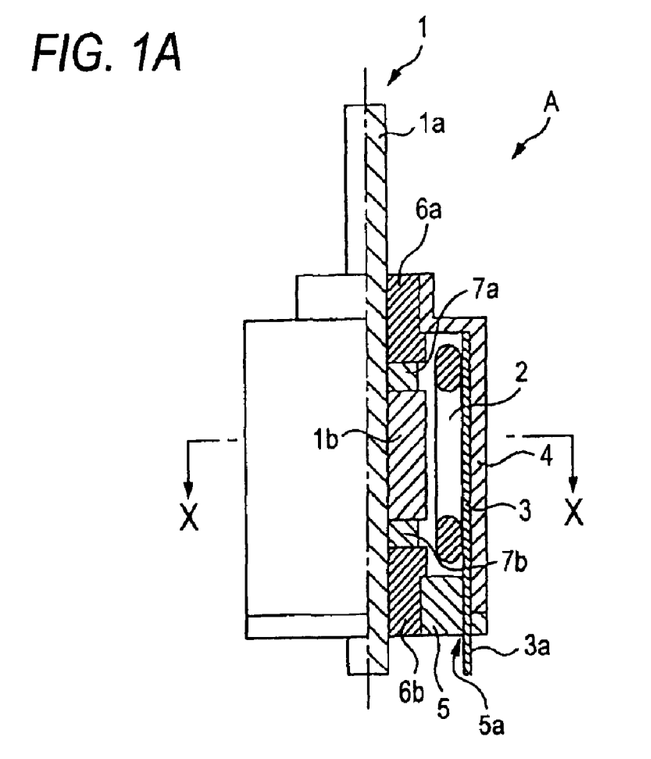
FIG. 1A is a view of a structure of a stepping motor A (left half shows outline, right half shows a section) according to an embodiment of the invention
Figure 1B:
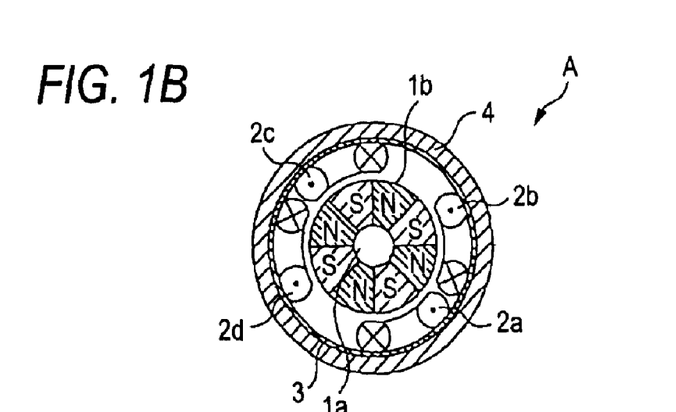
FIG. 1B is a sectional view (end face view) taken along a line X—X of FIG. 1A.
Figure 2:
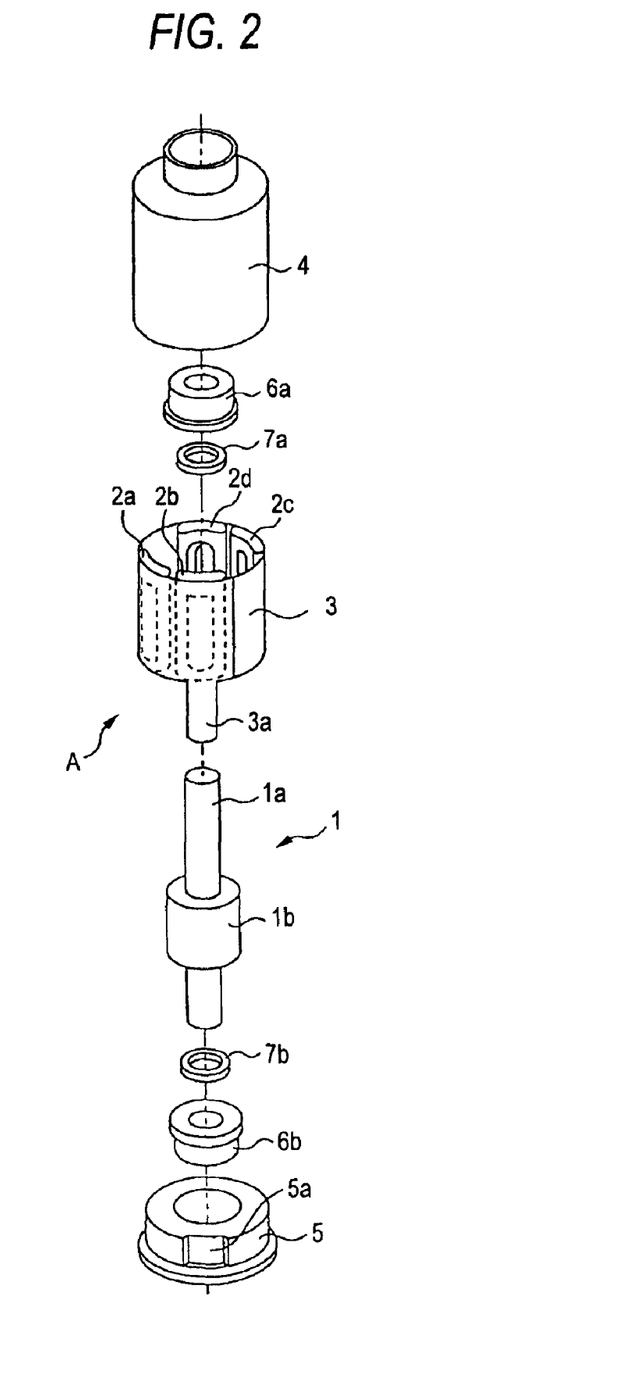
FIG. 2 is a disassembled view of the stepping motor A.

A preferable embodiment of the invention will be explained in reference to the drawings as follows First Embodiment FIG. 1A is a view of a structure of a stepping motor A according to an embodiment of the invention (left half shows an outlook, right half shows a section), FIG. 1B is a sectional view (end face view) taken along a line X—X of FIG. 1A and FIG. 2 is disassembled view of the stepping motor A. The stepping motor A is a PM (permanent magnet) type 2-phase stepping motor and is provided with the following constitution.

A rotor 1 comprises a shaft 1a and a permanent magnet 1b in a cylindrical shape and is constituted by penetrating the permanent magnet 1b by the shaft 1a. As shown in FIG. 1B, the permanent magnet 1b is magnetized in multipoles, arranged with N poles and S poles alternately in the peripheral direction and is magnetized in a total of 8 poles. The rotor 1 is supported to rotate smoothly by bearings 6a and 6b and washers 7a and 7b are provided between the rotor 1 and the bearings 6a and 6b.

At a surrounding of the permanent magnet 1b of the rotor 1, 4 coils 2a through 2d (hereinafter, generally referred to as coil 2) wound around a radius direction of the rotor 1 (in other words, around a direction of crossing a magnetic field generated from the permanent magnet 1b) are provided in a predetermined phase arrangement to constitute a stator. According to the embodiment, the coil 2 is constituted by winding, plural times, a coil material of copper wires or the like and forming a hole at a central portion thereof.

By using such a coil 2 of air core (careless), magnetic pole teeth are not present on a side of a stator and therefore, detent torque which is the conventional problem is not brought about and high speed response of the stepping motor A can be realized. Further, although according to the embodiment, the center of the coil 2 is hollowed, the center can be provided with a care made of a nonmagnetic material of resin or the like and detent torque is not generated also in this case and the coil is included in a range of the coil of the invention.

Further, the coils 2a and 2c are arranged symmetrically relative to an axial center for constituting a coil pair of a first phase and further, also the coils 2b and 2d are arranged symmetrically relative to the axis center to constitute a coil pair of a second phase. Further, the respective phases are arranged by providing a shift of an electric angle of 90 degrees.

Next, the coils 2 are supported by the supporter in a cylindrical shape. The supporter 3 is formed in the cylindrical shape by winding in an insulating film in a strip-like shape having a flexibility. As such a film, for example, a flexible board is preferable and according to the embodiment, there is assumed a case of using a flexible board as the supporter 3. A flexible board is constituted by, for example, an insulating material, a copper foil, a base material (base member) or the like, is generally about 0.1 mm through 0.2 mm in a thickness thereof and is provided with a flexibility and insulating performance. Although a film other than the flexible board is applicable as the supporter 3, a film generally having a thickness of about 0.1 mm through 0.2 mm is preferable.

Figure 3:
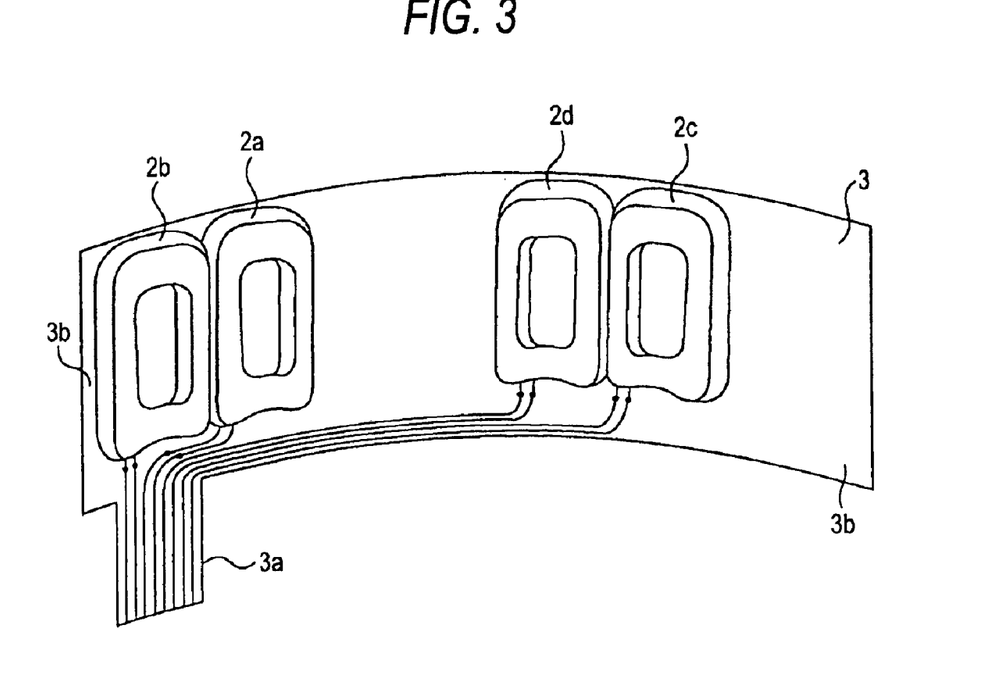
FIG. 3 is a development view of a supporter 3 provided with a coil 2.

Here, FIG. 3 is a development view of the supporter 3 provided with the coils 2. The coil 2 is fixed to a surface of the supporter 3 by an adhesive, a double coated tape or the like. The supporter 3 is provided with a terminal portion 3a where end portions of wiring patterns electrically connected to the respective coils 2 are aggregated. The terminal portion 3a is projected to outside of the stepping motor A to facilitate electric connection with a control circuit.

As shown in FIG. 3, the coil 2 is fixed to the supporter 3 in a state of developing the supporter 3 to constitute a strip-like shape. Next, the supporter 3 is wound to constitute the cylindrical shape such that the coil 2 is disposed on an inner side thereof. In this case, two end portions 3b of the supporter 3 may be adhered by an adhesive or the like. Thereafter, the supporter 3 is inserted into a casing 4, mentioned later, and an outer peripheral face of the supporter 3 is fixed to an inner peripheral face of the casing 4 by an adhesive or the like to thereby fix the coil 2 to the casing 4.

An advantage of adopting such a supporter 3 in supporting the coil 2 resides in the following point. First, the advantage resides in that since the supporter 3 is fixed to the casing 4, strength of the supporter 3 per se is not needed, a thickness thereof can be thinned and therefore, a diameter of the stepping motor A can be reduced and small-sized formation thereof is achieved. Conversely, with the same size, a space for further thickning a thickness of the coil 2 in a radius direction is ensured and therefore, a winding number of the coil can be increased and the thickness of the coil material can further be thickened to thereby provide larger rotational force. Further, the coil 2 can be attached to the supporter 3 in a state of developing the supporter 3 in a plane and therefore, operation of positioning, wiring or the like thereof is fabricated and integration thereof is further simplified.

Next, referring back to FIG. 1 and FIG. 2, the casing 4 is substantially constituted by a cylindrical shape and surrounds the permanent magnet 1b, the coil 2 and the supporter 3, mentioned above. The casing 4 ensures strength of the stepping motor A and functions as a magnetic path. A bracket 5 is attached to a lower end of the casing 4 and used as a lid of the casing 4. The bracket 5 is provided with a slit 5a and the terminal portion 3a of the supporter 3 is projected therefrom to outside of the stepping motor A.

In the stepping motor A having such a constitution, a magnetic field is generated in a radius direction thereof from the permanent magnet 1b. When electricity is conducted to the coil 2 under the state, a force in the peripheral direction is operated between the coil 2 and the permanent magnet 1b by a component of current flowing in the coil 2 orthogonal to the magnetic field from the permanent magnet 1b (Fleming's left hand rule). Furthers since the coil 2 is fixed, the rotor 1 is rotated.

In the case of the constitution of the embodiment, by supplying pulse voltages phases of which are shifted from each other by 90 degrees, a step angle becomes 22.5 degrees in 2 phase excitation. Further, half step drive is also possible by 1-2 phase excitation. Further, a microstep drive system can also be adopted.

Further, a number of magnetic poles of the permanent magnet 1b and a number of the coils 2 are not limited respectively to 8 and 4 but can pertinently be selected in a range of the number of the coil 2: n/2 relative to the number of the magnet poles of the permanent magnet 1b: 4×n (n is a integer equal to or lager than 1).

Second Embodiment

In the above-described first embodiments an alternating magnetic field is generated by rotating the permanent magnet 1b and eddy current is generated at the casing 4. Above all, when a stronger magnet is used as the permanent magnet 1b, eddy current loss is also increased. Meanwhile, although it is well known to provide a back yoke laminated with a plurality of sheets of magnetic bodies in order to prevent the eddy current loss, time and labor is taken for fabrication and integration thereof, which is not suitable for small-sized formation. Hence, according to the embodiment, there is provided a stepping motor capable of achieving small-sized formation while preventing eddy current.

Figure 4A:
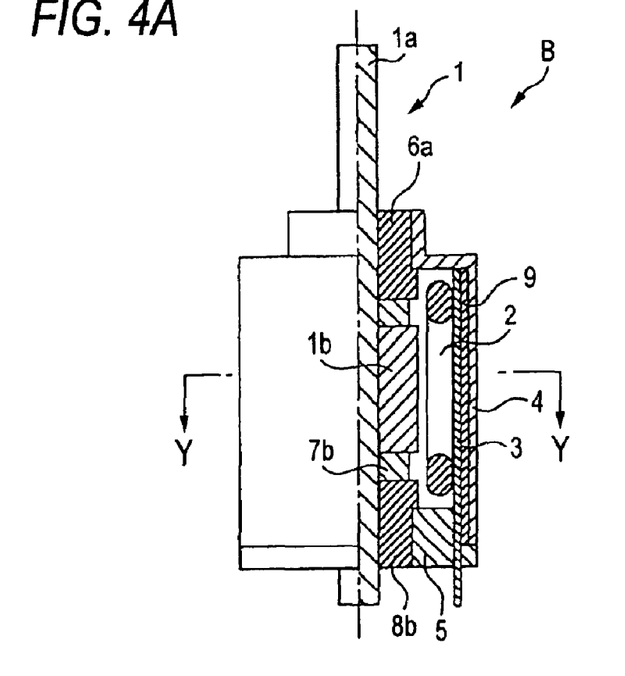
FIG. 4A is a view of a structure of a stepping motor B (left half shows outlook, right half shows a section) according to other embodiment of the invention
Figure 4B:
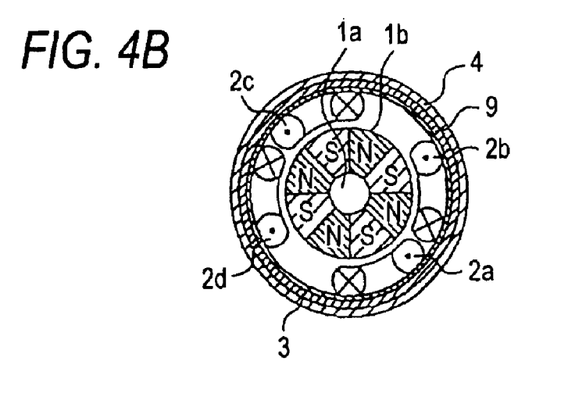
FIG. 4B is a sectional view (end face view) taken along a line Y—Y of FIG. 4A.

FIG. 4A is a view of a structure of a stepping motor B (left half shows an outlook, right half shows a section) of other embodiment of the invention and FIG. 4B is a sectional view (end face views) taken along a line Y—Y of FIG. 4A. An explanation will be given of a constitution thereof different from that of the above-described stepping motor A as follows.

A cylindrical member 9 is provided between the supporter 3 and the casing 4. The cylindrical member, 9 is fixed to an inner peripheral face of the casing 4 by an adhesive or the like at an outer peripheral face thereof and the supporter 3 is fixed to an inner peripheral face of the cylindrical shape member 9. Therefore, in the case of the embodiment, the supporter 3 is fixed to the casing 4 via the cylindrical member 9.

Figure 5:
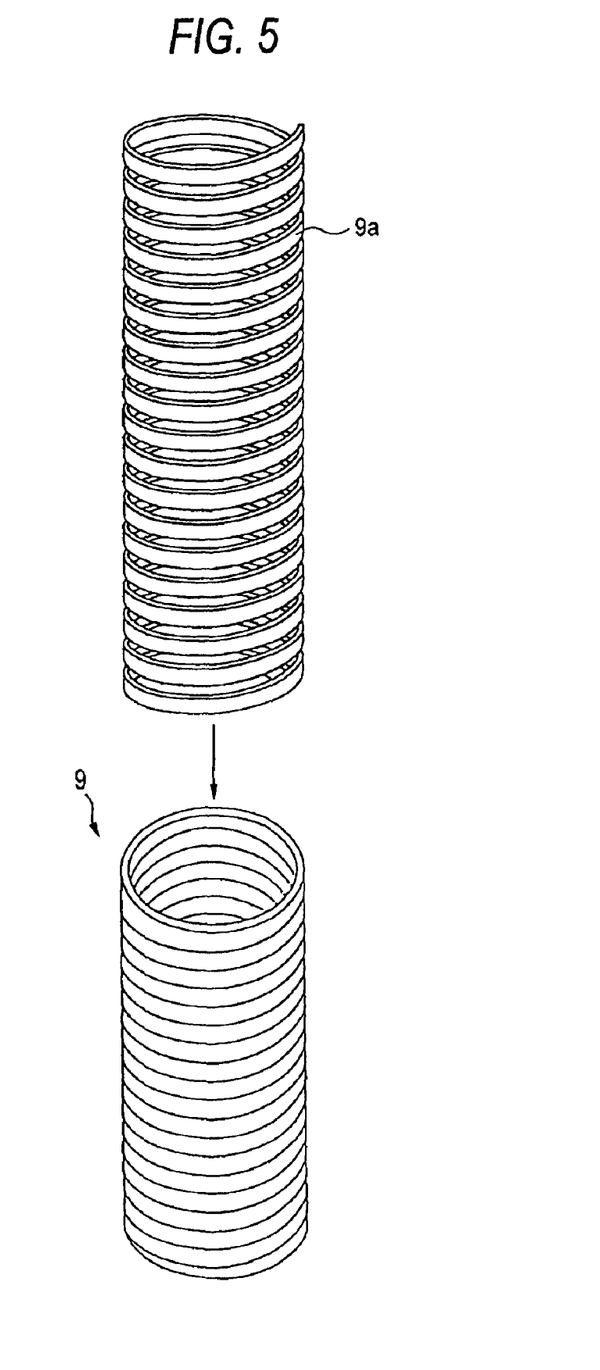
FIG. 5 is an outline view of a cylindrical member 9.

FIG. 5 is outline view of the cylindrical member 9. The cylindrical member 9 is constituted in a cylindrical shape by winding a magnetic material 9a a surface of which is insulatingly covered in a helical shape to be brought into close contact. As the magnetic material 9a, a material excellent in magnetic properties as a yoke material in which the permeability is high, the magnetic flux density is large and the coercive force is low is preferable, for example, a soft magnetic material of iron or the like is preferable.

Further, as shown in FIG. 5, by constituting a sectional shape of the magnetic material 9a by a quadrangular shape, an outer peripheral face and an inner peripheral face of the cylindrical member 9 can be constituted by smooth faces, clearances between the supporter 3 and the cylindrical member 9 and between the casing 4 and the cylindrical member 9 can be reduced and a magnetic efficiency can also be increased. Incidentally, a member having a circular sectional shape may be adopted and a reduction in cost can be desired since a wire material having such a sectional shape is generally spread.

When the cylindrical member 9 is provided, an effect equivalent to that of a laminated yoke is achieved at a portion of the cylindrical member orthogonal to a magnetic flux of the alternating magnetic field and therefore, the resistance can be increased, generation of eddy current can be restrained and the eddy current floss can be reduced. Further, since the cylindrical member 9 is formed by winding the magnetic material 9a in the strip-like shape in the helical shape and therefore, fabrication and integration thereof is simpler and the cylindrical member 9 is more suitable for small-sized formation than in the case of constituting the cylindrical member 9 by laminating a plurality of magnetic bodies and small-sized formation of a total of the stepping motor B can be realized.

Third Embodiment

Although according to the above-described first and second embodiments the rotor 1 is constituted by the shaft 1a and the permanent magnet 1b, in order to promote high speed response of the stepping motor, it is preferable to reduce moment of inertia of the rotor 1. In this case, it is not easy to ensure a sufficient magnetic flux amount for the permanent magnet magnetized in multipoles by reducing a surface area per pole, conversely, when the surface area per pole is widened by enlarging a diameter of the permanent magnet, the moment of inertia is extremely increased. Hence, according to the embodiment, there is provided a stepping motor reducing moment of inertia of a rotor and further promoting high speed response.

Figure 6A:
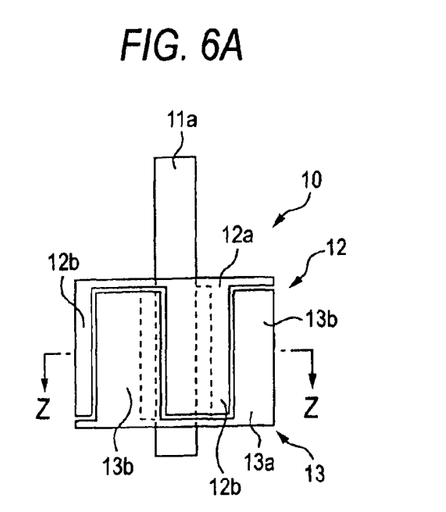
FIG. 6A is a front view of a rotor 10 according to other embodiment of the invention.
Figure 6B:
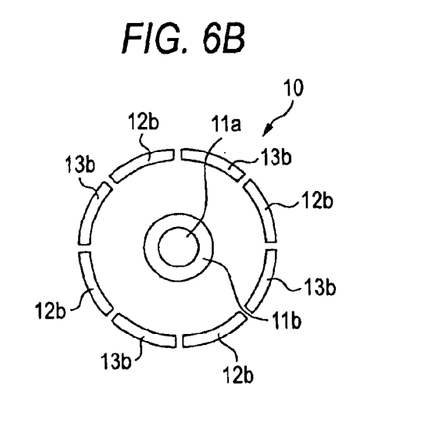
FIG. 6B is a sectional view (end face view) taken along a line Z—Z of FIG. 6A
Figure 6C:
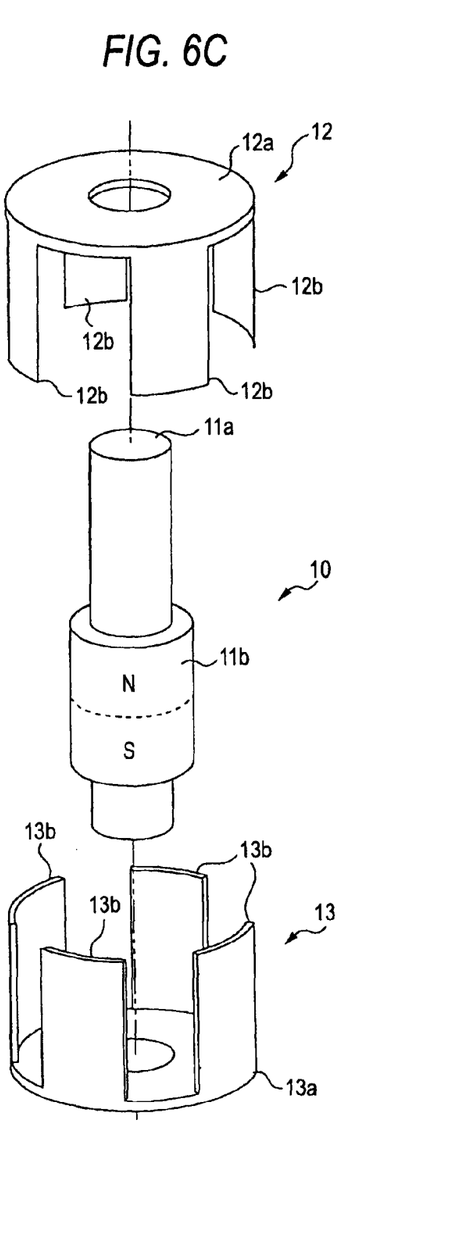
FIG. 6C is a disassembled view of the rotor 10.

FIG. 6A is a front view of a rotor 10 according to other embodiment of the invention, FIG. 6B is a sectional view taken along a line Z—Z of FIG. 6A and FIG. 6C is a disassembled view of the rotor 10.

The rotor 10 is provided with a shaft 11a and a permanent magnet 11b magnetized in 2 poles in an axial line direction and the shaft 11a penetrates the permanent magnet 11b. At a surrounding of the permanent magnet 11b, pluralities of magnetic pole teeth 12b and 13b in a plate-like shape having a section in a circular arc shape extended in the axial line direction of the permanent magnet 11b are arranged alternately in a ring-like shape, the magnetic pole teeth 12b constitute a member 12 by being integrally connected to a circular plate member 12a and the magnetic pole teeth 13b are connected to a circular plate member 13a to constitute a member 13 integrated therewith.

The circular plate member 12 is connected and fixed to an upper, end of the permanent magnet 11b and the circular plate member 13 is connected and fixed to a lower end of the permanent magnet 11b. Further, holes for passing the shaft 11a are provided at centers of respective circular plate members 12 and 13.

Both of the members 12 and 13 are constituted by a soft magnetic material and the end portion member 12 connected to the upper end of the permanent magnet 12b is provided with a magnetism of an N pole and the end potion member 13 connected to the lower end is provided with a magnetism of an S pole. Therefore, a magnetic flux in the axial line direction generated from the permanent magnet 11b is converted into a magnetic flux generated in a radius direction from the magnetic pole teeth 12b and 13b. As a result, the magnetic pole teeth 12b and 13b respectively connected to the circular plate members 12 and 13 alternately constitute rotor faces of multipoles alternately magnetize into the N poles and the S poles.

Therefore, since the rotor 10 is constituted by the permanent magnet magnetized in 2 poles in the axial direction and the members interposing the permanent magnets, a hollow portion is also increased and therefore, the moment of inertia is reduced and high speed response is promoted more than in the cases of the above-described first embodiment and second embodiment using only the permanent magnet magnetized in multipoles. Further, the members 12 and 13 can be formed comparatively easily and highly accurately by press-forming and therefore, a rotor having a high resolution which is not provided by a method of magnetizing a permanent magnet in multipoles can also be fabricated.

In the case of the embodiment, the rotor magnetized in multipoles is provided by using the permanent magnet magnetized in a single pole as the permanent magnet 11b, even when the magnetic flux is increased by increasing an outer periphery of the rotor 10 to thereby increase surface areas of the magnetic pole teeth 12b and 13b, an increase amount of the moment of inertia is small, the high speed response can be maintained by using the rotor along with a stepping motor restraining detent torque and microstep drive is also facilitated.

As has been explained above, according to the stepping motor of the invention, the high speed response is promoted by retraining the detent torque and the small-sized formation can be achieved.

What is claimed is:

1. A stepping motor comprising:
   a rotor including a permanent magnet magnetized in multipoles;
   a plurality of coils surrounding the rotor and wound around a radius direction of the rotor;
   a cylindrical supporter for supporting the plurality of coils, said supporter including a flexible board; and
   a casing for surrounding the permanent magnet, the plurality of coils and the supporter and fixed to the supporter,
   wherein the flexible board includes a wiring pattern one end portion of which is electrically connected to the plurality of coils, and a terminal portion at which another end portion of the wiring pattern aggregates.

2. The stepping motor according to claim 1, wherein the terminal portion is projected to outside of the casing.

3. A stepping motor comprising:
   a rotor including a permanent magnet magnetized in multipoles;
   a plurality of coils surrounding the rotor and wound around a radius direction of the rotor;

a cylindrical supporter for supporting the plurality of coils including an insulating film having a flexibility;

a casing for surrounding the permanent magnet, the plurality of coils and the supporter and fixed to the supporter; and a cylindrical member constituted by winding in a helical shape a soft magnetic material in a strip-like shape a surface of which is insulatingly covered.

4. A stepping motor comprising:

a rotor including a permanent magnet magnetized in multipoles;

a plurality of coils surrounding the rotor and wound around a radius direction of the rotor;

a cylindrical supporter for supporting the plurality of coils including an insulating film having a flexibility; and a casing for surrounding the permanent magnet, the plurality of coils and the supporter and fixed to the supporter;

wherein the rotor includes:

the permanent magnet magnetized in a single pole in an axial direction;

a plurality of magnetic pole teeth arranged at a surrounding of the permanent magnet and extended in an axial direction of the permanent magnet; and a pair of circular plate members respectively connected to end portions of the permanent magnet for supporting the magnetic pole teeth, and wherein the magnetic pole teeth are alternately formed on one of the circular plate members and on the other of the circular plate members.

5. A stepping motor comprising:

a rotor including a permanent magnet magnetized in multipoles;

a plurality of coils surrounding the rotor and wound around a radius direction of the rotor;

a cylindrical supporter for supporting the plurality of coils including an insulating film having a flexibility; and a casing for surrounding the permanent magnet, the plurality of coils and the supporter and fixed to the supporter, wherein a thickness of the insulating film falls in a range from 0.1 mm to 0.2 mm.

6. A stepping motor comprising:

a rotor including a permanent magnet and magnetized in multipoles;

a plurality of coils surrounding the rotor and wound around a radius direction of the rotor;

a cylindrical supporter for supporting the plurality of coils including an insulating film having a flexibility;

a casing for surrounding the permanent magnet, the plurality of coils and the supporter and fixed to the supporter; and a cylindrical member constituted by winding in a helical shape a strip comprising soft magnetic material.

7. A stepping motor comprising:

a rotor including a permanent magnet magnetized in a single pole in an axial direction;

a plurality of coils surrounding the rotor and wound around a radius direction of the rotor;

a cylindrical supporter for supporting the plurality of coils; and a casing for surrounding the permanent magnet, the plurality of coils and the supporter, wherein the rotor includes a plurality of magnetic pole teeth surrounding the permanent magnet, extended in an axial direction of the permanent magnet, and connected to the permanent magnet; and wherein the magnetic pole teeth are alternately connected to one end of the permanent magnet and to the other end of the permanent magnet.

8. The stepping motor according to claim 1, wherein said terminal portion is projected outside of said stepping motor to facilitate electrical connection with a control circuit.

9. The stepping motor according to claim 1, wherein said plurality of coils is fixed to said supporter by one of an adhesive and a tape.

10. The stepping motor according to claim 1, wherein said flexible board comprises an insulating material, a copper foil and a base material.

11. The stepping motor according to claim 1, wherein said supporter is fixed to an inner face of said casing by an adhesive.

12. The stepping motor according to claim 1, wherein said plurality of coils comprises a hollow center core.

13. The stepping motor according to claim 1, wherein said plurality of coils comprises a core comprising a non-magnetic resin material.

* * * * *